(12) United States Patent
Han et al.

(10) Patent No.: US 8,885,747 B2
(45) Date of Patent: Nov. 11, 2014

(54) INFORMATION PROCESSING METHOD, DEVICE, AND SYSTEM

(75) Inventors: Chongyang Han, Chengdu (CN); Jun Chen, Shanghai (CN); Jing Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/293,673

(22) Filed: Nov. 10, 2011

(65) Prior Publication Data

US 2012/0057644 A1 Mar. 8, 2012

Related U.S. Application Data

(63) Continuation of application No. PCT/CN2009/071800, filed on May 14, 2009.

(51) Int. Cl.
*H04B 7/02* (2006.01)
*H04B 7/06* (2006.01)
*H04B 7/04* (2006.01)

(52) U.S. Cl.
CPC .............. *H04B 7/0639* (2013.01); *H04B 7/022* (2013.01); *H04B 7/0404* (2013.01); *H04B 7/0413* (2013.01)
USPC ............. 375/267; 375/296; 375/299; 455/69; 370/328

(58) Field of Classification Search
CPC .... H04B 7/0417; H04B 7/0456; H04B 7/063; H04B 7/0632; H04B 7/0634; H04B 7/0639; H04B 7/0404

USPC .......... 375/260, 267, 296, 299; 370/328, 329, 370/252, 236, 334; 455/69, 502, 517, 525
See application file for complete search history.

(56) References Cited

U.S. PATENT DOCUMENTS

| | | | |
|---|---|---|---|
| 6,791,958 B2 * | 9/2004 | Spear et al. | 370/331 |
| 8,140,019 B2 * | 3/2012 | Kim et al. | 455/63.1 |
| 8,155,687 B2 * | 4/2012 | Englund et al. | 455/522 |
| 2003/0054825 A1 * | 3/2003 | Chen et al. | 455/442 |
| 2005/0249149 A1 * | 11/2005 | Kasturi et al. | 370/328 |
| 2006/0034240 A1 * | 2/2006 | Kwak et al. | 370/342 |
| 2007/0142074 A1 * | 6/2007 | Black et al. | 455/522 |

(Continued)

FOREIGN PATENT DOCUMENTS

| | | | |
|---|---|---|---|
| CN | 101257367 A | | 9/2008 |
| CN | 101262310 A | | 9/2008 |

(Continued)

OTHER PUBLICATIONS

Extended European Search Report mailed Mar. 21, 2012, for European Patent Application No. 09844510.9.

(Continued)

*Primary Examiner* — Sophia Vlahos
(74) *Attorney, Agent, or Firm* — Leydig, Voit & Mayer, Ltd.

(57) ABSTRACT

In the field of communications, an information processing method, device, and system are provided. The information processing method includes: receiving Precoding Control Indications (PCIs); determining a target PCI according to statistics of the PCIs and/or sources of the PCIs; and performing uplink Multiple Input Multiple Output sending control according to the target PCI. A User Equipment and an information processing system are also provided.

18 Claims, 2 Drawing Sheets

(56) References Cited

U.S. PATENT DOCUMENTS

| | | | |
|---|---|---|---|
| 2007/0155388 A1* | 7/2007 | Petrovic et al. | 455/442 |
| 2008/0227472 A1* | 9/2008 | Harel et al. | 455/456.6 |
| 2008/0260059 A1 | 10/2008 | Pan | |
| 2009/0190685 A1* | 7/2009 | Kimura | 375/267 |
| 2010/0027713 A1 | 2/2010 | Huang et al. | |
| 2010/0246516 A1* | 9/2010 | Pelletier et al. | 370/329 |
| 2011/0117952 A1* | 5/2011 | Burstrom et al. | 455/522 |

FOREIGN PATENT DOCUMENTS

| | | | |
|---|---|---|---|
| CN | 101272364 A | 9/2008 | |
| CN | 101399801 A | 4/2009 | |
| WO | WO 2008/022243 | | 2/2008 |
| WO | WO 2008/022243 A2 | | 2/2008 |
| WO | WO 2008/113031 | | 9/2008 |

OTHER PUBLICATIONS

Written Opinion of the International Searching Authority (translation) dated (mailed) Feb. 25, 2010, issued in related Application No. PCT/CN2009/071800, filed May 14, 2009, Huawei Technologies Co., Ltd.

International Search Report for International Application No. PCT/CN2009/071800, mailed Feb. 25, 2010, Huawei Technologies Co., LTD.

$1^{st}$ Office Action in corresponding Chinese Patent Application No. 200980119206.3 (May 23, 2013).

* cited by examiner

INFORMATION PROCESSING METHOD, DEVICE, AND SYSTEM

CROSS-REFERENCE TO RELATED APPLICATIONS

This application is a continuation of International Application No. PCT/CN2009/071800, filed on May 14, 2009, which is hereby incorporated by reference in its entirety.

FIELD OF THE INVENTION

The present invention relates to the field of communications, and in particular, to an information processing method, device, and system.

BACKGROUND OF THE INVENTION

Currently, Multiple Input Multiple Output (MIMO) is adopted in the downlink transmission of a Wideband Code Division Multiple Access (WCDMA) system. Specifically, a User Equipment (UE) calculates Precoding Control Indication (PCI) information according to received pilot information and feeds back the PCI information to a current serving NodeB. The serving NodeB performs MIMO scheduling on the downlink data according to the received PCI information and the condition of the NodeB.

In an existing WCDMA system, a UE can send uplink data to a network side through only one antenna and cannot use a multi-antenna technology to send uplink data.

SUMMARY OF THE INVENTION

Embodiments of the present invention provide an information processing method, device, and system. The embodiments of the present invention adopt the following technical solutions.

An information processing method includes:
receiving PCIs;
determining a target PCI according to statistics of the PCIs and/or sources of the PCIs; and
performing uplink MIMO sending control according to the target PCI.

A UE includes:
a receiving unit, configured to receive PCIs;
a determining unit, configured to determine a target PCI according to statistics of the PCIs received by the receiving unit and/or sources of the PCIs; and
a controlling unit, configured to perform uplink MIMO sending control according to the target PCI.

An information processing system includes a UE which is connected to at least one NodeB in a communicable mode, where:
the UE is configured to receive PCIs generated by the NodeBs, determine a target PCI according to statistics of the PCIs and/or sources of the PCIs, and perform uplink MIMO sending control according to the target PCI.

With the information processing method, device, and system according to the embodiments of the present invention, the UE is able to receive PCIs and determine a target PCI for uplink MIMO sending control, so that the UE is able to send uplink data using a multi-antenna technology, which effectively increases the transmission rate of uplink data.

BRIEF DESCRIPTION OF THE DRAWINGS

To better explain the technical solution of embodiments of the present invention or the prior art, the accompanying drawings required in the description of the embodiments or the prior art are briefly described hereafter. Apparently, the accompanying drawings illustrate only some exemplary embodiments of the present invention and persons skilled in the art can derive other drawings from these drawings without creative efforts.

DETAILED DESCRIPTION OF THE EMBODIMENTS

The technical solution of embodiments of the present invention is described clearly and completely in the following with reference to the accompanying drawings. Apparently, the embodiments herein are only a part rather than all of the embodiments of the present invention. Based on the embodiments of the present invention, persons skilled in the art can derive other embodiments without creative efforts and such other embodiments all fall within the protection scope of the present invention.

Figure 1:
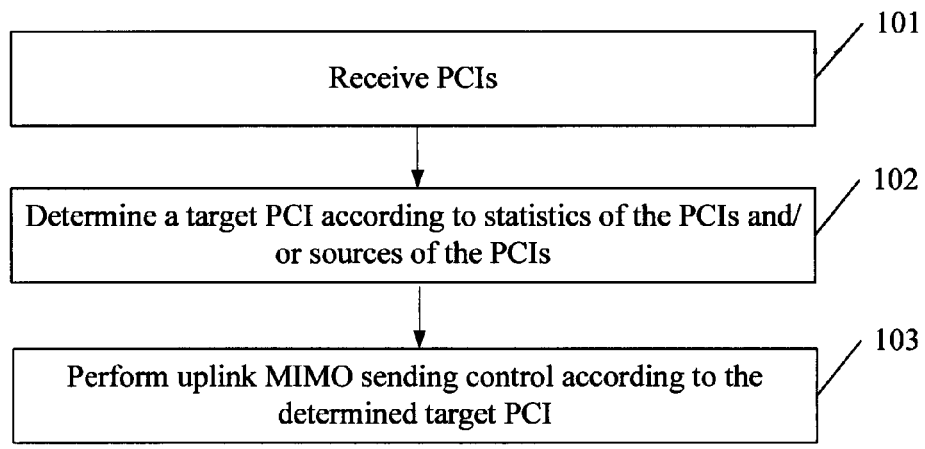
FIG. 1 is a flow chart of an information processing method according to an embodiment of the present invention.

As shown in FIG. 1, an embodiment of the present invention provides an information processing method, including the following steps.

Step 101: Receive PCIs.

Step 102: Determine a target PCI according to statistics of the PCIs and/or sources of the PCIs.

Figure 1A:
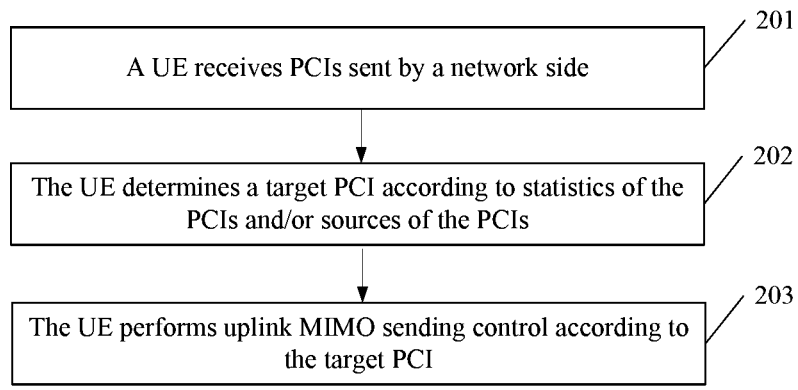

FIG. 1a is a flow chart of another information processing method according to an embodiment of the present invention;

Step 103: Perform uplink MIMO sending control according to the determined target PCI.

According to the information processing method provided in the embodiment of the present invention, PCIs are received and a target PCI is determined for uplink MIMO sending control, so that a UE is able to send uplink data using a multi-antenna technology, which effectively increases the transmission rate of uplink data.

In steps 101 and 102 in the embodiment of the present invention, the UE may receive multiple PCIs sent by all or part of cells in an uplink Enhanced-Dedicated Channel (E-DCH) active set. Then, the UE may collect statistics of cell signal strength of these cells and determine the PCI sent by the cell of the strongest cell signal strength as the target PCI; or the UE may collect statistics of reception quantities of the PCIs and determine the PCI of the largest reception quantity as the target PCI; or the UE may first collect statistics of the reception quantities of the PCIs and then, if more than one PCI with the largest reception quantity exists, determine the PCI sent by a serving E-DCH cell in the PCIs of the largest reception quantity as the target PCI.

In steps 101 and 102 in the embodiment of the present invention, the UE may receive a PCI sent by the serving E-DCH cell and determine the PCI as the target PCI.

In steps 101 and 102 in the embodiment of the present invention, the UE may receive multiple PCIs sent by all or part of cells in a serving E-DCH radio link set and perform soft combination of the PCIs, and determine a PCI obtained through the soft combination as the target PCI.

In the embodiment of the present invention, that the UE receives multiple PCIs may include following circumstances: (1) at least two of the PCIs received by the UE have different values; and (2) at least two of the PCIs received by the UE have the same value. The value of a PCI is determined by a network side. For example, the PCIs sent by cells in the serving E-DCH radio link set are the same; the PCIs sent by cells in the E-DCH active set and the PCIs sent by cells outside the serving E-DCH radio link set may be different and may also be different from PCIs sent by cells in the serving E-DCH radio link set.

Optionally, in the embodiment of the present invention, the UE may send the determined target PCI to the network side. For example, the UE may send the target PCI and relevant uplink data to the network side.

As shown in FIG. 1a, an embodiment of the present invention provides another information processing method, including the following steps.

Step 201: A UE receives PCIs sent by a network side.

Figure 2:
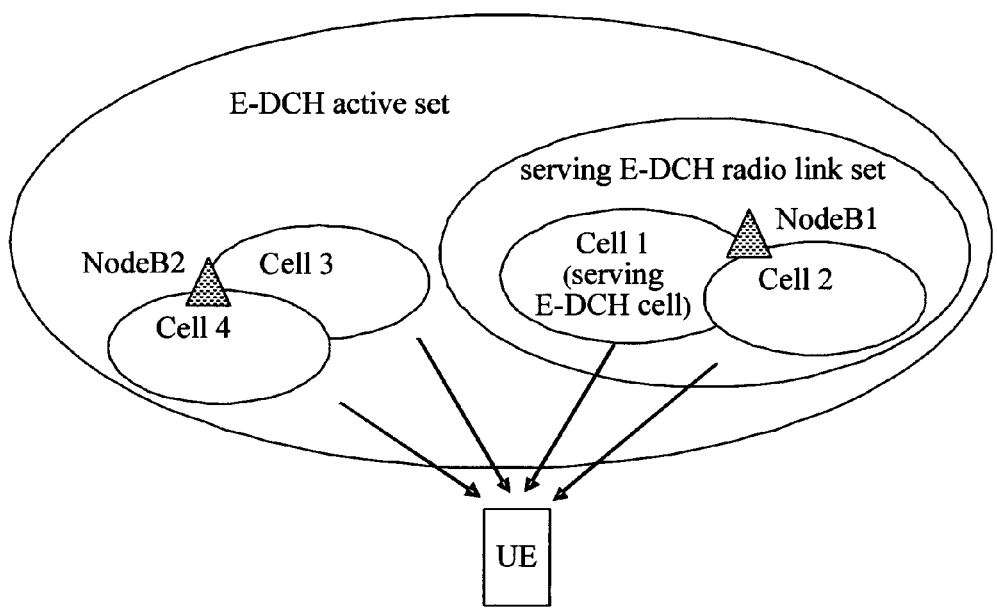
FIG. 2 is a schematic structure diagram of a network system adopted by another information processing method according to an embodiment of the present invention.

In a WCDMA system, an E-DCH active set is a set of cells that provide E-DCH bearers for a UE. As shown in FIG. 2, cell 1, cell 2, cell 3, and cell 4 are cells in the current E-DCH active set of the UE, where cell 1 and cell 2 are cells in a serving E-DCH radio link set which is a set of cells from which the UE may receive and combine relative grant information. Cell 1 is a serving E-DCH cell of the UE, that is, a cell where the UE may receive absolute grant information. A UE has one and only one corresponding serving E-DCH cell.

In the embodiment of the present invention, PCIs may be generated by NodeBs controlling the cells in the E-DCH active set and sent by all cells in the E-DCH active cell. For example, PCIs are generated by NodeB 1 and NodeB 2 shown in FIG. 2 and sent by cell 1, cell 2, cell 3, and cell 4. The PCI generated by a NodeB in the active set of the UE may be a PCI most favorable to the NodeB, for example, a PCI that enables maximum receive power when the NodeB acts as a receiver. The PCIs generated by different NodeBs may be the same or not the same. For example, the PCI generated by NodeB 1 is sent by cell 1 and cell 2, and therefore the PCIs sent by cell 1 and cell 2 are the same; the PCI generated by NodeB 2 is different from the PCI generated by NodeB 1, and therefore the PCIs sent by cell 3 and cell 4 are the same but are different from the PCIs sent by cell 1 and cell 2.

Definitely, in the embodiment of the present invention, PCIs may be generated by only NodeB 1 controlling the serving E-DCH cell and sent by the serving E-DCH cell or serving E-DCH radio link set. For example, the PCI is only sent by cell 1 or sent by cell 1 or by both cell 1 and cell 2.

It should be noted that, in a soft handover process, the UE may communicate with multiple E-DCH cells, and a Radio Network Controller (RNC) in the network side may select one or more NodeBs controlling cells in the E-DCH active set according to a preset selecting policy to generate PCIs for the UE, and the generated PCI is sent by all or part of cells in the E-DCH active set. For example, the RNC may select a NodeB controlling a cell in the E-DCH active set to generate a PCI for the UE and the PCI is sent by all or part of cells in the active set of the UE, thereby increasing the flexibility for the UE to determine the target PCI. For another example, the RNC may select the NodeB controlling the serving E-DCH cell to generate a PCI for the UE and the PCI is only sent by the serving E-DCH cell of the UE, so that the UE performs uplink MIMO sending control under the control of the serving NodeB while the downlink channel resources and power resources of other cells in the active set are saved. Accordingly, the UE receives only the PCI sent by the serving E-DCH cell and may determine the PCI as the target PCI and perform uplink MIMO sending control according to the target PCI. For another example, the RNC may select a NodeB controlling the serving E-DCH radio link set to generate a PCI for the UE and the PCI is sent by the serving E-DCH radio link set of the UE, so that the PCIs sent by cells in the serving E-DCH radio link set are the same, which increases the reliability for the UE to receive the PCI.

Furthermore, the PCIs have a mapping relationship with weighting factors of antennas on the UE side. Therefore, the network side provides the weighting factors of antennas on the UE side to the UE through the PCIs and the UE implements uplink MIMO sending control after acquiring information of the weighting factors of antennas according to the PCIs. In the embodiment of the present invention, assuming that two antennas on the UE side exist, where the weighting factor $w_1^{pref}$ of the first antenna is a constant, for example $$w_1^{pref} = \frac{1}{\sqrt{2}},$$

where the value of $w_1^{pref}$ is pre-configured on the UE and the NodeB; and the weighting factor $w_2^{pref}$ of the second antenna can be selected from a set, for example:

$$w_2^{pref} \in \left\{ \frac{1+j}{2}, \frac{1-j}{2}, \frac{-1+j}{2}, \frac{-1-j}{2} \right\}$$

Because the weighting factor $w_1^{pref}$ of the first antenna is a constant, the PCI may include only information of the weighting factor $w_2^{pref}$ of the second antenna selected by the NodeB for the UE. The same mapping relationship between the weighting factor $w_2^{pref}$ of the second antenna and PCI as shown in Table 1 is pre-stored on the UE and the NodeB. For example, the PCI value is 1, and the weighting factor $w_2^{pref}$ of the second antenna is $$\frac{1-j}{2}.$$

TABLE 1

| $w_2^{pref}$ | PCI Value |
|---|---|
| $\frac{1+j}{2}$ | 0 |
| $\frac{1-j}{2}$ | 1 |
| $\frac{-1+j}{2}$ | 2 |
| $\frac{-1-j}{2}$ | 3 |

To keep PCI information effective, the NodeB may periodically generate a PCI for the UE and send the PCI to the UE. For example, the NodeB may generate a PCI for the UE in each Transmission Time Interval (TTI) and send the PCI to the UE through all or part of cells in the E-DCH active set or the serving E-DCH radio link set. Definitely, the NodeB may also generate a PCI for the UE according to other preset periods and send the PCI to the UE through all or part of cells in the E-DCH active set or the serving E-DCH radio link set, which is not described here.

Step 202: The UE determines a target PCI according to statistics of the PCIs and/or sources of the PCIs.

For example, when the multiple PCIs received in step 201 are sent by all or part of cells in the E-DCH active set, the UE may determine the target PCI in any of the following manners:

(1) The UE may collect statistics of cell signal strength of the sources of the multiple PCIs, and if the strength of cell signals sent by a certain cell is the strongest among all cells that have sent the PCIs, determine the PCI sent by this cell as the target PCI.

(2) The UE may collect statistics of reception quantities of PCIs, and if a certain PCI has the largest reception quantity, determine this PCI as the target PCI. For example, the UE receives four PCIs, where the value of two PCIs is 0, the value of one PCI is 1, and the value of one PCI is 2, and then the UE may determine the PCI with the value of 0 as the target PCI.

(3) The UE may collect statistics of the reception quantities of the multiple PCIs and determine the target PCI with reference to the sources of the PCIs. Specifically, if the UE finds that the reception quantity of more than one PCI is the same and the largest among the reception quantities of the PCIs, the UE determines the PCI sent by the serving E-DCH cell in the PCIs of the largest reception quantity as the target PCI.

For another example, if the PCI received in step 201 is sent by the serving E-DCH cell, the UE may determine this PCI as the target PCI.

For another example, if the PCIs received in step 201 are sent by all or part of cells in the serving E-DCH radio link set, because the PCIs sent by cells in the serving E-DCH radio link set are the same, the UE may first perform soft combination of the PCIs received from the cells and then determine the PCI obtained through the soft combination as the target PCI.

For another example, the UE may determine the target PCI from the received PCIs in other manners. For example, different priorities are set for the target PCI determining methods described above, and when PCIs are received, the UE uses a feasible method of a high priority to determine the target PCI, which is not further described here.

Step 203: The UE performs uplink MIMO sending control according to the target PCI.

Specifically, if the UE side is configured with two antennas, when there is uplink data to transmit, the UE may send two data blocks to the network side through the two antennas using uplink MIMO technology. The UE may send different uplink data through the two antennas or send the same uplink data through the two antennas. When the UE sends the same uplink data through the two antennas, the UE may use uplink closed-loop transmit diversity technology to send the uplink data to the network side through the two antennas.

For example, the UE performs uplink MIMO sending control on the two data blocks according to the target PCI includes the following process.

The UE obtains the weighting factor $w_2^{pref}$ of the second antenna using the pre-stored Table 1 according to the target PCI, weights the first data block according to the weighting factor $w_2^{pref}$ of the second antenna and the pre-stored weighting factor $w_1^{pref}$ of the first antenna, and then sends the data through the two antennas.

The UE determines the weighting factor of the first antenna W3 and the weighting factor of the second antenna W4 corresponding to the second data block according to preset mapping relationships between $w_1^{pref}$ and $w_2^{pref}$ corresponding to the first data block and W3 and W4 corresponding to the second data block. For example, the mapping relationships between $w_1^{pref}/w_2^{pref}$ and W3/W4 is: $W3=w_1^{pref}$ and $W4=-w_2^{pref}$. Then, the UE weights the second data block according to W3 and W4 and sends the data block through the two antennas.

It should be noted that if the closed-loop transmit diversity is adopted to bear data, only $w_1^{pref}$ and $w_2^{pref}$ are required to weight the data.

Furthermore, in the embodiment of the present invention, when the UE is in a soft handover process, the UE may communicate with multiple cells. In step 202, the UE determines one target PCI and the cell that sends the target PCI can receive data normally. To enable other cells to acquire the target PCI determined by the UE, to receive data normally, and to utilize an uplink macro diversity gain, after step 202, the UE may send the determined PCI to the network side and the network side stores information of the received target PCI.

With the information processing method provided in the embodiment of the present invention, the UE can receive PCIs and determine a target PCI from the received PCIs, and perform uplink MIMO sending control according to the target PCI, so that the UE can use the multi-antenna technology to send uplink data, which effectively increases the transmission rate of uplink data and reduces the delay in data transmission.

Figure 3:
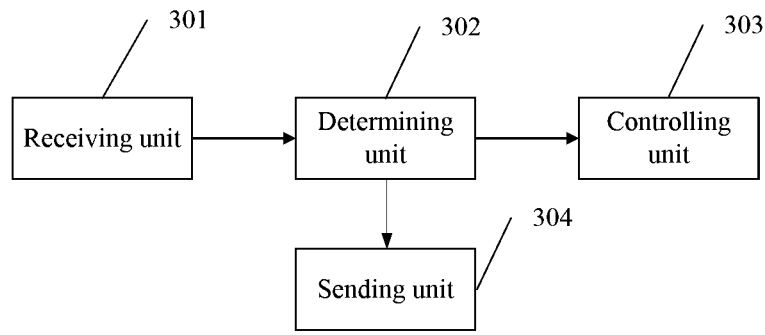
FIG. 3 is a schematic structure diagram of a UE according to an embodiment of the present invention.

As shown in FIG. 3, an embodiment of the present invention provides a UE which can implement the information processing method provided in the foregoing embodiments of the present invention. The UE includes:

a receiving unit 301, configured to receive PCIs;

a determining unit 302, configured to determine a target PCI according to statistics of the PCIs received by the receiving unit 301 and/or sources of the PCIs; and a controlling unit 303, configured to perform uplink MIMO sending control according to the target PCI determined by the determining unit 302.

Optionally, the receiving unit 301 may be configured to receive multiple PCIs sent by all or part of cells in an uplink E-DCH active set. Accordingly, the determining unit 302 is configured to collect statistics of cell signal strength of the cells sending the multiple PCIs received by the receiving unit 301 and determine the PCI sent by the cell of the strongest cell signal strength as the target PCI. The determining unit 302 may be further configured to collect statistics of the reception quantities of the multiple PCIs received by the receiving unit 301 and determine the PCI of the largest reception quantity as the target PCI. The determining unit 302 may be further configured to collect statistics of the reception quantities of the multiple PCIs received by the receiving unit 301 and if more than one PCI of the largest reception quantity exists, determine the PCI sent by a serving E-DCH cell in the PCIs of the largest reception quantity as the target PCI.

Optionally, the receiving unit 301 may be configured to receive a PCI sent by the serving E-DCH cell; and the determining unit 302 may be configured to determine the PCI received by the receiving unit 301 as the target PCI.

Because the PCIs sent by cells in a serving E-DCH radio link set are the same, optionally, the receiving unit 301 may be configured to receive multiple PCIs sent by all or part of cells in the serving E-DCH radio link set; and the determining unit 302 may be configured to perform soft combination of the multiple PCIs received by the receiving unit 301 and determine the PCI obtained through the soft combination as the target PCI.

Optionally, the UE may further include:

a sending unit 304, configured to send the target PCI determined by the determining unit 302 to a network side.

The UE provided in the embodiment of the present invention can receive PCIs and determine a target PCI from the received PCIs, and perform uplink MIMO sending control according to the target PCI, so that the UE can use the multi-antenna technology to send uplink data, which effectively increases the transmission rate of uplink data and reduces the delay in data transmission.

Figure 4:
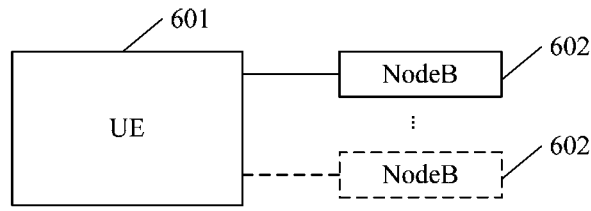
FIG. 4 is a schematic structure diagram of an information processing system according to an embodiment of the present invention.

As shown in FIG. 4, an embodiment of the present invention provides an information processing system, which can implement the information processing method provided in the foregoing embodiments of the present invention. The system includes a UE 601 which is connected to at least one NodeB 602 in a communicable mode. For example, the UE 601 establishes a wireless connection with the cell under one NodeB in a communicable mode.

In the system, the UE 601 is configured to receive PCIs from NodeBs 602, determine a target PCI according to statistics of the PCIs and/or sources of the PCIs, and perform uplink MIMO sending control according to the target PCI.

For example, the UE 601 may receive multiple PCIs sent by all or part of cells in an E-DCH active set. Then, the UE 601 may collect statistics of cell signal strength of these cells and determine the PCI sent by the cell of the strongest cell signal strength as the target PCI; or the UE 601 may collect statistics of the reception quantities of the PCIs and determine the PCI of the largest reception quantity as the target PCI; or the UE may first collect statistics of the reception quantities of the PCIs and then, if more than one PCI with the largest reception quantity exists, determine the PCI sent by a serving E-DCH cell in the PCIs of the largest reception quantity as the target PCI.

For another example, the UE 601 may receive a PCI sent by the serving E-DCH cell and determine the PCI as the target PCI.

For another example, the UE 601 may receive multiple PCIs sent by all or part of cells in a serving E-DCH radio link set and perform soft combination of the PCIs, and determine the PCI obtained through the soft combination as the target PCI.

With the information processing system provided in the embodiment of the present invention, the UE can receive PCIs and determine a target PCI from the received PCIs, and perform uplink MIMO sending control according to the target PCI, so that the UE can use the multi-antenna technology to send uplink data, which effectively increases the transmission rate of uplink data and reduces the delay in data transmission.

Persons skilled in the art understand that all or part of the steps in the methods provided in the foregoing embodiments of the present invention can be implemented by hardware under the instruction of a program. The program may be stored in a computer readable storage medium, such as a Read Only Memory (ROM), a Random Access Memory (RAM), a magnetic disk, or a Compact Disk-Read Only Memory (CD-ROM).

Detailed in the foregoing are only exemplary embodiments of the present invention, but the protection scope of the present invention is not limited thereto. Any modification or substitution readily conceivable by persons skilled in the art within the scope of the technology disclosed herein shall fall within the protection scope of the present invention. Therefore, the scope of the present invention is subject to the appended claims.

What is claimed is:

1. An information processing method, comprising:
    receiving, by a user equipment (UE), a Precoding Control Indication (PCI);
    determining, by the UE, a target PCI according to the received PCI;
    determining, by the UE, a weighting factor corresponding to the target PCI; and
    applying, by the UE, the weighting factor to send data in an uplink closed-loop transmit diversity manner;
    wherein the determining, by the UE, the target PCI according to the received PCI comprises:
    if the received PCI comprises multiple PCIs sent by all or part of cells from a serving Enhanced Dedicated Channel (E-DCH) radio link set of the UE, determining, by the UE, a PCI combined from the multiple PCIs sent by all or part of the cells from the serving E-DCH radio link set of the UE as the target PCI, wherein the multiple PCIs are generated by a NodeB controlling the cells from the serving E-DCH radio link set of the UE with a same PCI value.

2. The method according to claim 1, wherein after the determining, by the UE, the target PCI according to the received PCI, the method further comprises:
    sending, by the UE, the target PCI to a NodeB controlling all or part of the cells in an E-DCH active set of the UE.

3. The method according to claim 1, wherein the PCI is received by the UE when the UE is in a soft handover process.

4. The method according to claim 1, wherein the applying, by the UE, the weighting factor comprises:
    weighting, by the UE, a data block according to the weighting factor.

5. The method according to claim 4, wherein the method further comprises:
    sending, by the UE, output of the process of weighting the data block in the uplink closed-loop transmit diversity manner.

6. The method according to claim 1, wherein the weighting factor corresponding to the target PCI is determined according to the target PCI and a mapping of a weighting factor and a PCI, the mapping of the weighting factor and the PCI are stored by the UE.

7. The method according to claim 1, wherein a manner of combination of the received PCI is soft combination.

8. The method according to claim 1, wherein the PCI is received by the UE periodically.

9. A User Equipment (UE), comprising:
    a receiver, configured to receive a Precoding Control Indication (PCI); and
    a processor, configured to determine a target PCI according to the PCI received by the receiver, determine a weighting factor corresponding to the target PCI, and apply the weighting factor to send data in an uplink closed-loop transmit diversity manner;
    wherein the determining the target PCI comprises:
    if the PCI received by the receiver comprises multiple PCIs sent by all or part of cells from a serving Enhanced Dedicated Channel (E-DCH) radio link set of the UE, determining a PCI combined from the multiple PCIs sent by all or part of the cells from the serving E-DCH radio link set of the UE as the target PCI, wherein the multiple PCIs are generated by a NodeB controlling the cells from the serving E-DCH radio link set of the UE with a same PCI value.

10. The UE according to claim 9, further comprising:
    a sender, configured to send the target PCI determined by the processor to a NodeB controlling all or part of the cells in an E-DCH active set of the UE.

11. The UE according to claim 9, wherein the receiver is configured to receive the PCI when the UE is in a soft handover process.

12. The UE according to claim 9, wherein the processor is configured to weight a data block according to the weighting factor.

13. The UE according to claim 12, the UE further comprising:
  a sender, configured to send output of the process of weighting the data block in the uplink closed-loop transmit diversity manner.

14. The UE according to claim 9, wherein the processor is configured to determine the weighting factor corresponding to the target PCI according to the target PCI and a mapping of a weighting factor and a PCI; and
  the UE further comprising:
    a memory, configured to store the mapping of the weighting factor and the PCI.

15. The UE according to claim 9, wherein the processor is further configured to combine the PCI received by the receiver in a manner of soft combination.

16. The UE according to claim 9, wherein the receiver is configured to receive the PCI periodically.

17. The UE according to claim 9, wherein the processor is further configured to determine whether the PCI received by the receiver comprises the multiple PCIs sent by all or part of the cells from the serving E-DCH radio link set of the UE.

18. A system, comprising a User Equipment (UE) connected to a NodeB in a communicable mode, wherein:
  the UE is configured to receive a Precoding Control Indication (PCI) from the NodeB, determine a target PCI according to the received PCI, determine a weighting factor corresponding to the target PCI, and apply the weighting factor to send data in an uplink closed-loop transmit diversity manner;
  wherein the determining the target PCI comprises
  if the received PCI comprises multiple PCIs sent by all or part of cells from a serving Enhanced Dedicated Channel (E-DCH) radio link set, determining a PCI combined from the multiple PCIs sent by all or part of the cells from the serving E-DCH radio link set of the UE as the target PCI, wherein the multiple PCIs are generated by a NodeB controlling the cells from the serving E-DCH radio link set of the UE with a same PCI value.

* * * * *